(12) United States Patent
Feenstra et al.

(10) Patent No.: US 7,508,566 B2
(45) Date of Patent: Mar. 24, 2009

(54) SWITCHABLE OPTICAL ELEMENT

(75) Inventors: Bokke Johannes Feenstra, Eindhoven (NL); Robert Andrew Hayes, Eindhoven (NL); Rudolph Maria Snoeren, Eindhoven (NL); Stein Kuiper, Eindhoven (NL); Bernardus Hendrikus Wilhelmus Hendriks, Eindhoven (NL); Anton Petrus Maria Van Arendonk, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 669 days.

(21) Appl. No.: 10/527,867

(22) PCT Filed: Sep. 12, 2003

(86) PCT No.: PCT/IB03/03927

§ 371 (c)(1),
(2), (4) Date: Mar. 16, 2005

(87) PCT Pub. No.: WO2004/027489

PCT Pub. Date: Apr. 1, 2004

(65) Prior Publication Data

US 2005/0270672 A1    Dec. 8, 2005

(30) Foreign Application Priority Data

Sep. 19, 2002    (EP)    ................ 02078939

(51) Int. Cl.
*G02B 26/02*    (2006.01)

(52) U.S. Cl. ........................................ 359/228
(58) Field of Classification Search .................. 359/228
See application file for complete search history.

(56) References Cited

U.S. PATENT DOCUMENTS

| | | | |
|---|---|---|---|
| 3,756,700 A | 9/1973 | Saxe | |
| 4,591,253 A | 5/1986 | Hecker et al. | |
| 4,636,785 A * | 1/1987 | Le Pesant | ............. 345/37 |
| 4,774,537 A | 9/1988 | Moody | |
| 5,523,815 A | 6/1996 | Tamura | |
| 6,033,132 A | 3/2000 | Seo | |
| 6,880,238 B1 * | 4/2005 | Kumar et al. | ............ 29/730 |
| 2001/0017985 A1 | 8/2001 | Tsuboi et al. | |
| 2003/0006140 A1 * | 1/2003 | Vacca et al. | ............ 204/547 |

FOREIGN PATENT DOCUMENTS

| | | |
|---|---|---|
| JP | 04056934 A | 2/1992 |
| JP | 11038336 A | 2/1999 |
| JP | 2001013306 A | 1/2001 |
| JP | 2001228307 A | 8/2001 |
| JP | 04268539 A | 9/2001 |
| JP | 2001249282 A | 9/2001 |
| WO | 03071346 A1 | 8/2003 |

* cited by examiner

Primary Examiner—Joshua L Pritchett (57) ABSTRACT

A switchable optical element has a fluid chamber including immiscible first and second bodies of fluid disposed relative to one another along an optical axis of the element. The second body of fluid is movable in a direction away from the optical axis (A) by electro-wetting action, giving the switchable optical element a changeable transmissivity along the optical axis.

29 Claims, 9 Drawing Sheets

SWITCHABLE OPTICAL ELEMENT

FIELD OF THE INVENTION

The present invention relates to switchable optical elements, to optical devices including switchable optical elements. The present invention further relates to methods of manufacturing switchable optical elements and to methods of manufacturing optical scanning devices. The switchable optical element is particularly suitable for, but not limited to use as an optical diaphragm, shutter or colour filter.

BACKGROUND OF THE INVENTION

Switchable optical elements including shutters, diaphragms etc. based on mechanical moving parts are known. Switchable optical elements based on mechanical moving parts have optical transmission properties that can be switched between predetermined states of differing optical transmittance, for example, states of high or low amplitude attenuation. However, mechanical moving parts can be relatively large and expensive to produce. Furthermore, mechanical moving parts are subject to wear, so have a limited lifespan and may suffer from reliability problems during their lifespan.

Figure 12:
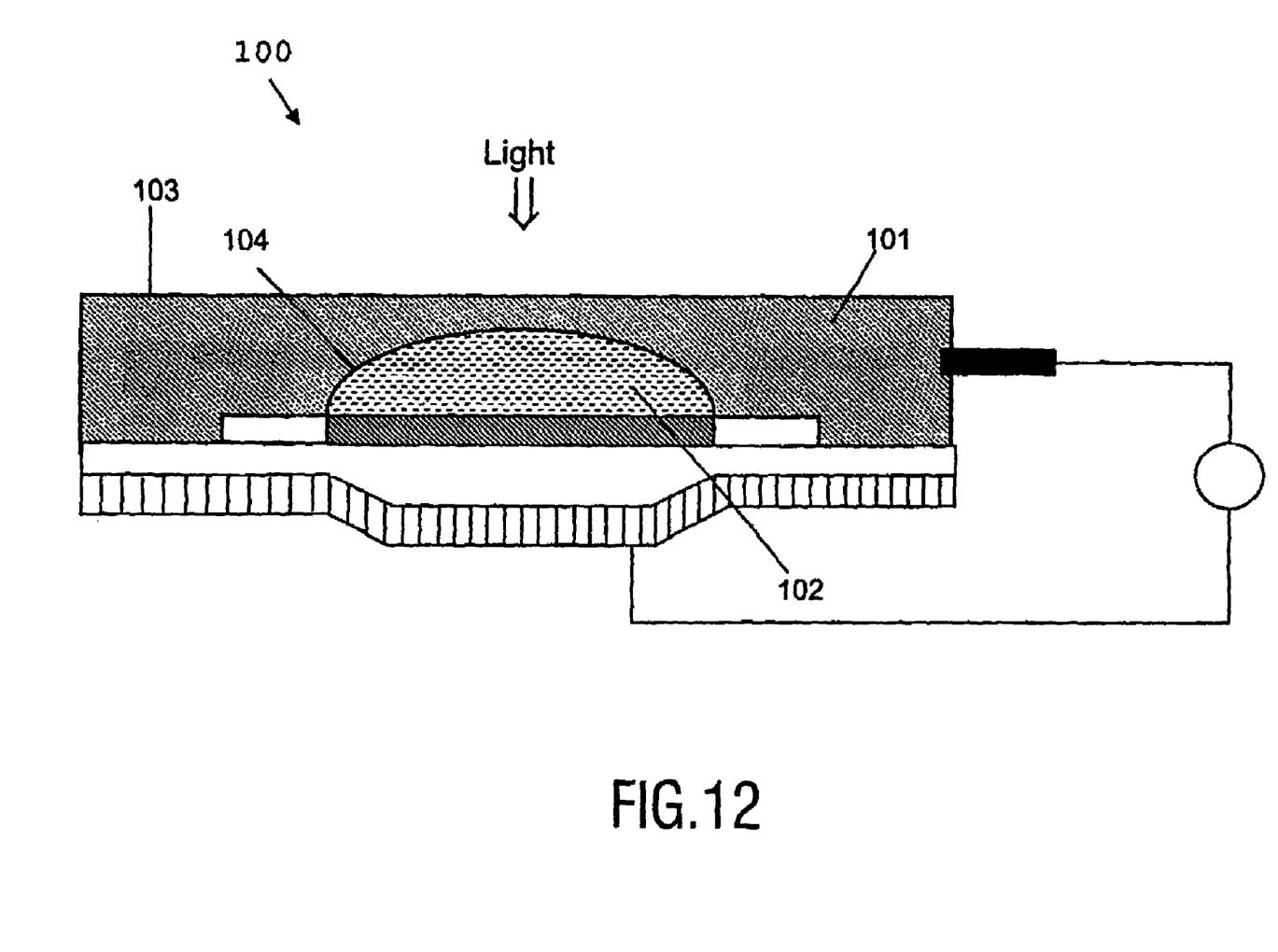
FIG. 12 shows a side view of a prior art device arranged in an off state.
Figure 13:
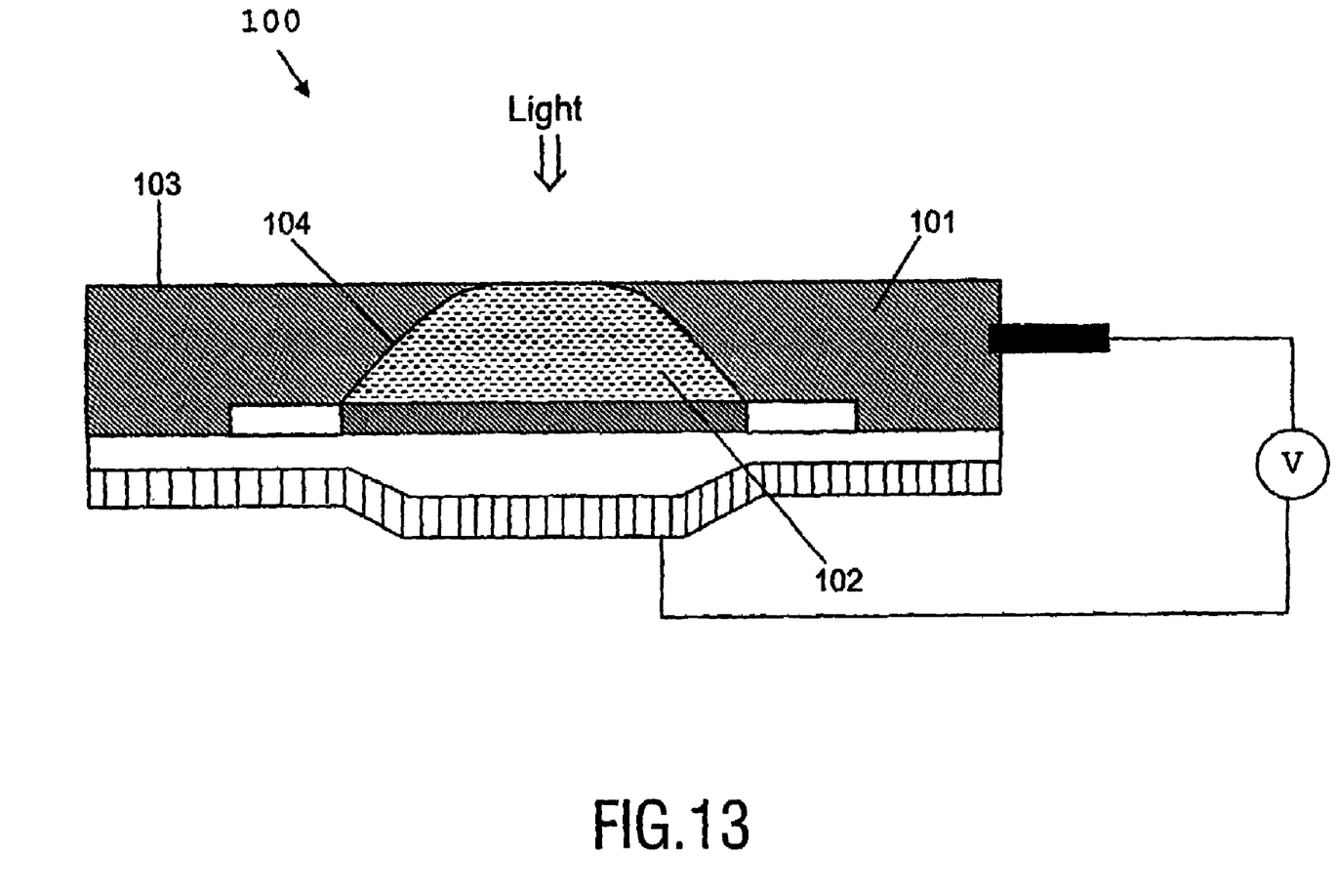
FIG. 13 shows a side view of device of FIG. 12 arranged in an on state.

The U.S. patent application 2001/0017985 describes an optical device which does not require mechanical moving parts and has optical transmission properties that can be switched between predetermined states. FIGS. 12 and 13 show the device 100, which comprises a substantially opaque first fluid 101 and a substantially transparent second fluid 102 sealed in a container 103. The fluids do not mix, and are arranged in the container 103 such that their boundary 104 forms a section of a substantially spherical surface. Using electro capillarity (electro-wetting) the shape of the boundary 104 between the first and second fluid 101,102 can be changed between the arrangement of FIG. 12, and that of FIG. 13.

In the arrangement of FIG. 12 no voltage is applied to the device 100, and light incident on the device 100 is blocked by the substantially opaque first fluid 101. Applying a voltage to the device gives rise to the arrangement of FIG. 13. In FIG. 13 the boundary 104 between the first and second fluids 101,102 is shaped so that the first fluid 101 is be excluded from the optical path of the device 100. The shape of the boundary 104 is controlled so that the boundary 104 contacts an interior surface of the container 103, forcing the first fluid 101 away from the area of contact. Light incident on the device 100 is therefore not blocked by the first fluid 101, and the device 100 is substantially transparent.

The device 100 suffers a number of drawbacks. Firstly, the device 100 is relatively inflexible as the shape of the area of contact is hard to control to be anything other than circular. Secondly, in practice it may be difficult to separate the second fluid 102 from the interior surface of the container 103 when changing from an on state (FIG. 13) to an off state (FIG. 12). The separation and adhesion of the second fluid 102 on the interior surface will, most likely, show a non-monotonic transition.

Thirdly, in the off state the curvature of the interface 104 between the two fluids means that the device may not have uniform transmission characteristics across its area. Fourthly, due to the curved surface, the optically active area is significantly smaller than the actual size of the device. Fifthly, as the boundary 104 between the two fluids is generally curved, the fluids must be of substantially equal refractive index to avoid introducing a lens effect at the boundary. Other demands are placed on the properties of the fluids to enable the electro-wetting effect to take place, and to give the desired variability in transmittance characteristics. Therefore, the range of fluids available for use in the device is relatively restricted, and to achieve a working device compromises may have to be made on some properties.

It is an aim of preferred embodiments of the present invention to provide a switchable optical element, which addresses one or more of the problems of the prior art, whether referred to herein or otherwise. A further aim is to provide a method of manufacturing such an element.

STATEMENTS OF THE INVENTION

In a first aspect, the present invention provides a switchable optical element comprising: a fluid chamber including first and second bodies of fluid disposed relative to one another along an optical axis of the switchable optical element, a first electrode coupled to the first body of fluid, and a second electrode, wherein the second body of fluid is arranged to move substantially transverse to the optical axis in response to a voltage applied to the first and second electrodes and thereby change the transmissivity of the fluid chamber along the optical axis.

Such a device can be designed with non-circular or other shaped active areas. Also, the second fluid does not need to contact an interior surface of the fluid chamber to provide a substantial change in transmissivity, therefore the problem of separating the second fluid from such a surface does not arise. Furthermore, a substantially planar interface between the first and second fluids is possible, giving a high degree of uniformity across the element. This also avoids the problem of introducing a lens effect due the boundary between the first and second fluids, meaning a wider range of fluids can be used in the switchable element and therefore fewer compromises have to be made in fluid selection. Moreover, a substantially planar interface allows the element to be thin.

In another aspect, the present invention provides optical devices comprising a switchable optical element, wherein the switchable optical element comprises a fluid chamber including first and second bodies of fluid disposed relative to one another along an optical axis of the switchable optical element, a first electrode coupled to the first body of fluid, and a second electrode, wherein the second body of fluid is arranged to move substantially transverse to the optical axis in response to a voltage applied to the first and second electrodes and thereby change the transmissivity of the fluid chamber along the optical axis.

In another aspect, the present invention provides a method of manufacturing a switchable optical element, the method comprising the steps of: providing a fluid chamber including first and second bodies of fluid disposed relative to one another along an optical axis of the switchable optical element; and providing a first electrode coupled to the first body of fluid, and a second electrode, wherein the second body of fluid is arranged to move substantially transverse to optical axis in response to a voltage applied to the first and second electrodes and thereby change the transmissivity of the fluid chamber along the optical axis.

In another aspect, the present invention provides a method of manufacturing an optical scanning device for scanning an information layer of an optical record carrier, the method comprising the steps of: providing a first radiation source for generating a first radiation beam; providing an objective system for converging the first radiation beam on the information layer; and providing a switchable optical element arranged to control the first radiation beam, the method characterised in that the switchable optical element provided comprises: a fluid chamber including first and second bodies of fluid disposed relative to one another along an optical axis of the switchable optical element, a first electrode coupled to the first body of fluid, and a second electrode, wherein the second body of fluid is arranged to move substantially transverse to the optical axis in response to a voltage applied to the first and second electrodes and thereby change the transmissivity of the fluid chamber along the optical axis.

Other aims and advantages of the present invention will be apparent from the preferred features as set out in the accompanying claims.

BRIEF DESCRIPTION OF DRAWINGS

For a better understanding of the invention, and to show how embodiments of the same may be carried into effect, reference will now be made, by way of example, to the accompanying diagrammatic drawings in which.

DETAILED DESCPRIPTION OF PREFERRED EMBODIMENTS

The present inventors have realised that it is possible to overcome the drawbacks associated with the device 100 of FIGS. 12 and 13, and have provided a switchable optical element which is compact, has no mechanical moving parts and can be used in a number of applications. By providing a switchable optical element in which a body of fluid is arranged to move substantially transverse to the optical axis of the element it is possible to achieve a large number of effects, for example a variable aperture diaphragm, a switchable colour filter and a shutter. The operation of a first embodiment of the present invention working as a shutter will now be described.

Figure 1:
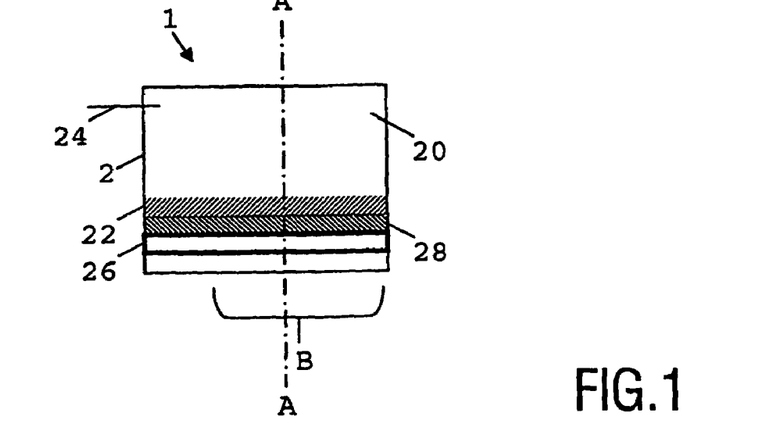
FIG. 1 shows a side view of a switchable optical element according to a first preferred embodiment of the present invention in a first state.

FIG. 1 shows a side view of a switchable optical element 1 according to a first preferred embodiment of the present invention in a first state. The optical axis of the switchable optical element 1 is parallel to the line A-A, and the active area of the device extends over the region B. The switchable optical element 1 comprises a fluid chamber 2, first body of fluid 20, and a second body of fluid 22 arranged to form a shutter. The first and second bodies of fluid 20,22 are made up of substantially immiscible fluids, and displaced relative to one another along the optical axis. The second body of fluid 22 is substantially opaque and in the first state is arranged within the switchable optical element 1 to form a continuous layer across the region B and thereby prevent light from passing through the switchable optical element 1 at region B. In the first state the shutter is shut.

Figure 2:
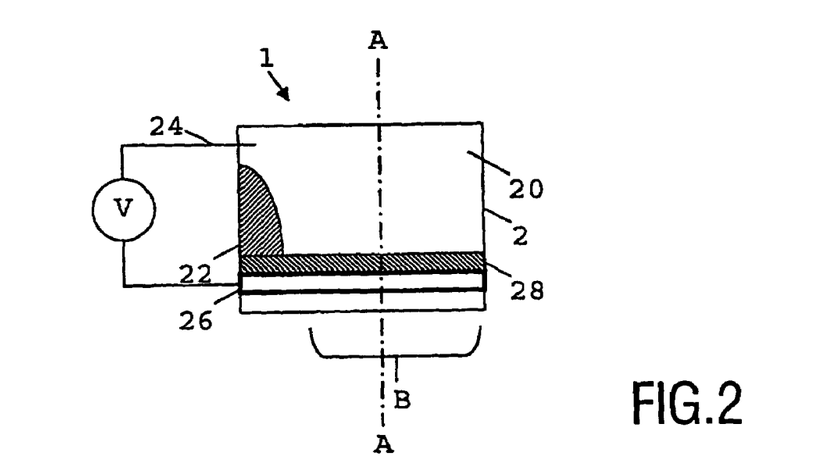
FIG. 2 shows a side view of the switchable optical element of FIG. 1 in a second state.

FIG. 2 shows a side view of the switchable optical element 1 in a second state. In the second state the second body of fluid 22 is arranged so that light can be transmitted along the optical axis A-A and through the region B. In the second state the shutter is opened by drawing the second body of fluid 22 aside and away from the region B in a direction away from and transverse to the optical axis.

The operation of the switchable optical element 1 will now be described in more detail; in particular it will be described how the second body of fluid 22 is used to switch the switchable optical element 1 from the first state to the second state.

Also shown in FIGS. 1 and 2 are a first electrode 24, a second electrode 26, and a dielectric contact layer 28. The contact layer 28 comprises an insulating barrier between the second electrode 26 and the first and second bodies of fluid 20,22. In the switchable optical element 1 the first body of fluid 20 comprises a polar or conducting liquid, here water, and the second body of fluid 22 comprises a non-conducting liquid, here oil. The oil and water are substantially immiscible and therefore form the distinct first and second bodies of fluid 20,22. The oil and water are chosen to have substantially equal density, rendering the switchable optical element 1 relatively immune from gravitational and inertial effects. If the element is sufficiently small, the density of first and second fluid can differ. The contact layer 28 comprises an electrically insulating material having a hydrophobic surface. The hydrophobic surface of the contact layer 28 ensures that the switchable optical element 1 will settle in the first state as shown in FIG. 1 when at rest.

The second electrode 26 and the contact layer 28 are in the optical path of the device, and are therefore made from substantially transparent materials. For example, the second electrode 26 comprises a layer of the transparent conductor indium tin oxide, which is well known in the field of liquid crystal displays.

Other light transmitting conducting layers, e.g. $RuO_2$, PEDOT could be used. The contact layer comprises an amorphous fluorocarbon, as materials of this type are highly hydrophobic, have a low dielectric constant and offer good optical transmissivity. Other materials having the correct combination of properties, e.g. polyamides could be used.

The first electrode 24 is coupled to the first body of fluid 20 by direct contact therewith. By providing direct contact between the first electrode 24 and the first body of fluid 20 it is possible to ensure good electrically conductive contact there between. However, it is possible to couple the first electrode 24 to the first body of fluid 20 through capacitive coupling. In contrast, the second electrode 26 is preferably separated from the first and second bodies of fluid 20,22. The contact layer 28 forms an insulating barrier between the interior of the fluid chamber 2 and the second electrode 26.

By applying a voltage to the first and second electrodes 24,26 from a voltage source V the electro-wetting effect increases the wettability of the contact layer 28 by the water. This is due to free charges in the water being repelled from the first electrode 24 and attracted to the second electrode 26 and therefore causing the water to be attracted to the second electrode 26. In effect, the second electrode 26 is capacitively coupled to the first body of fluid 20. If sufficient voltage is applied the water is forced to contact the contact layer 28 and the oil is moved aside, giving the second state shown in FIG. 2, in which the oil is moved away from the optical axis and the region B. Removing the voltage from the first and second electrodes 24,26 allows the switchable optical element 1 to return to the arrangement of FIG. 1.

Figure 3:
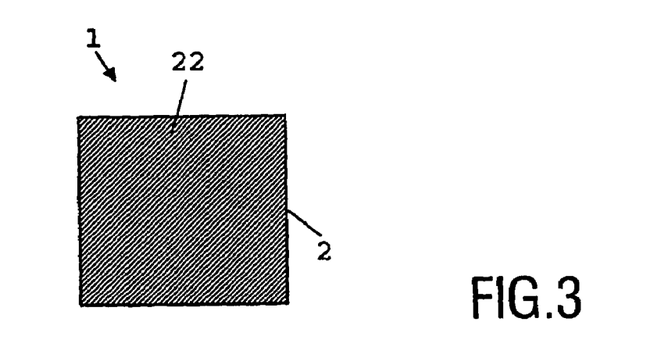
FIG. 3 shows a plan view of the switchable optical element of FIG. 1 in the first state.
Figure 4:
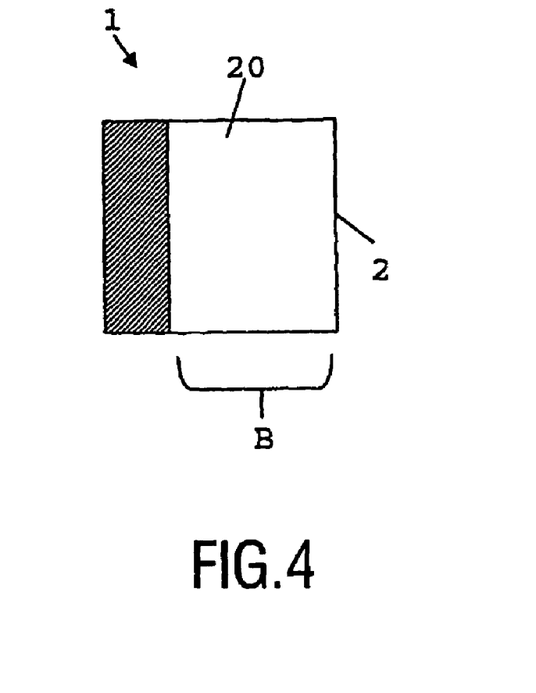
FIG. 4 shows a plan view of the switchable optical element of FIG. 1 in the second state.

FIGS. 3 and 4 show plan views of the switchable optical element 1 of FIGS. 1 and 2 in the first and second states respectively. As can be seen, the switchable optical element 1 comprises a substantially square shape, however, other shapes including circular, elliptical, hexagonal or irregular shapes are possible.

A number of techniques can be used to ensure the oil moves away from the optical axis in a predictable and reproducible manner. Varying the wettability of interior surfaces of the fluid chamber 2 provides a convenient technique for controlling the direction of oil movement in response to an applied voltage.

As an example of oil motion, in the embodiment of FIGS. 1 and 2 the second electrode 26 is divided into a number of equally sized independently addressable line sections which run parallel to one another across the contact layer 28. By applying a voltage to the independently addressable line sections in turn, the wettability of the contact layer 28 above those sections can be increased in turn, thereby controlling the position at which oil motion is initiated, and the subsequent direction of oil movement across the contact layer 28. When a voltage is applied to switch the switchable optical element 1 from the first state to the second state, the independently addressable line sections can have a voltage sequentially applied to each one at a time across the region B, with other sections not energised. This produces a constant sized moving area of increased wettability beneath the line section to which a voltage is being supplied.

Other electrode combinations can be used to control the movement of the oil. For example, a number of independently addressable concentric annular electrodes can be used to control the movement away from their common centre by applying a voltage to each in turn, starting from the innermost. In another example, an electrode having one non-conducting area or an area where the electrode is absent below the contact layer could be used. In this case the oil will tend to gather at the region above the non-conducting area. With a homogeneous electrode, oil motion can be obtained with motion initialising at a manufacturing or other inhomogeneity present in the device.

As an alternative to controlling the wettability of the contact layer by applying different electrode voltages the inherent wettability of the contact layer can be varied across the element, for example by providing a first area of the contact layer having a first wettability by the water, and a second, less hydrophobic area which has a second, higher wettability. In this case, motion of the oil in response to the voltage applied to the electrodes will be initiated from the relatively less hydrophobic region.

The interior surfaces of the fluid chamber can be given an inhomogeneity to increase the reproducibility of motion of the second body of fluid in response to an applied electrode voltage.

For example by coating the side walls of the fluid chamber with hydrophobic or hydrophilic materials so that a variation in the interfacial tension between the side walls and the oil/water can increase the reproducibility of oil motion in a particular direction in response to an applied electrode voltage. Moreover, the wettability of the wall can be chosen such that the liquid-liquid interface is substantially planar in the off-state, or has a specific radius of curvature (e.g. to enhance initiation of oil displacement around the optical axis).

Also, the interior surfaces of the fluid chamber can be given some geometric inhomogeneity, e.g. an irregular feature such as e.g. a projection extending towards the centre of the device. Features which are not symmetrical about the optical axis of the device can also provide a suitable inhomogeneity allowing an increase in reproducibility in the oil motion that occurs in response to an applied electrode voltage.

The thickness or dielectric properties of the contact layer can be given a predetermined profile across the element, to give differing electric field strength at different areas in response to an applied electrode voltage. This will produce a local increase in the electro-wetting effect. For example, at thinner regions of the contact layer the water and second electrode are relatively closer together, producing a higher field. Movement of the oil is initiated at a region of higher field due to the increased wettability in this region. A contact layer having a first concave surface in contact with the second electrode and a second substantially planar surface in contact with the oil could be used.

In this case the oil layer above the thinnest portion of the contact layer would move first, with the oil motion progressing from this area.

Yet a further technique to locally increase the electro-wetting effect comprises providing a protrusion extending from the contact layer. The protrusion can be arranged to extend from the oil layer and communicate directly with the water when no voltage is applied to the electrodes. The availability of the surface of the protrusion to the water provides the water with a starting point from which it can more easily displace the oil when a voltage is applied to the electrodes. In addition, the protrusion may be covered with a hydrophilic coating in the region which protrudes from the oil layer, as an increase in the wettability of the protrusion by the water in the region which protrudes from the oil layer increases the effect of the protrusion. Alternatively, the protrusion can be arranged to stay beneath the oil layer when no voltage is applied to the electrodes and offer a local increase in the electro-wetting effect by reducing the separation of the contact layer and the water.

By using the abovementioned techniques alone, or in combination, a switchable optical element can be produced which acts as a variable aperture diaphragm, with the oil moving away from a central region on the optical axis. The diaphragm produced can be used as a replacement for mechanical diaphragms, for example within a laser resonant cavity, within an optical disk recording/reproducing system, or in a camera.

Figure 5:
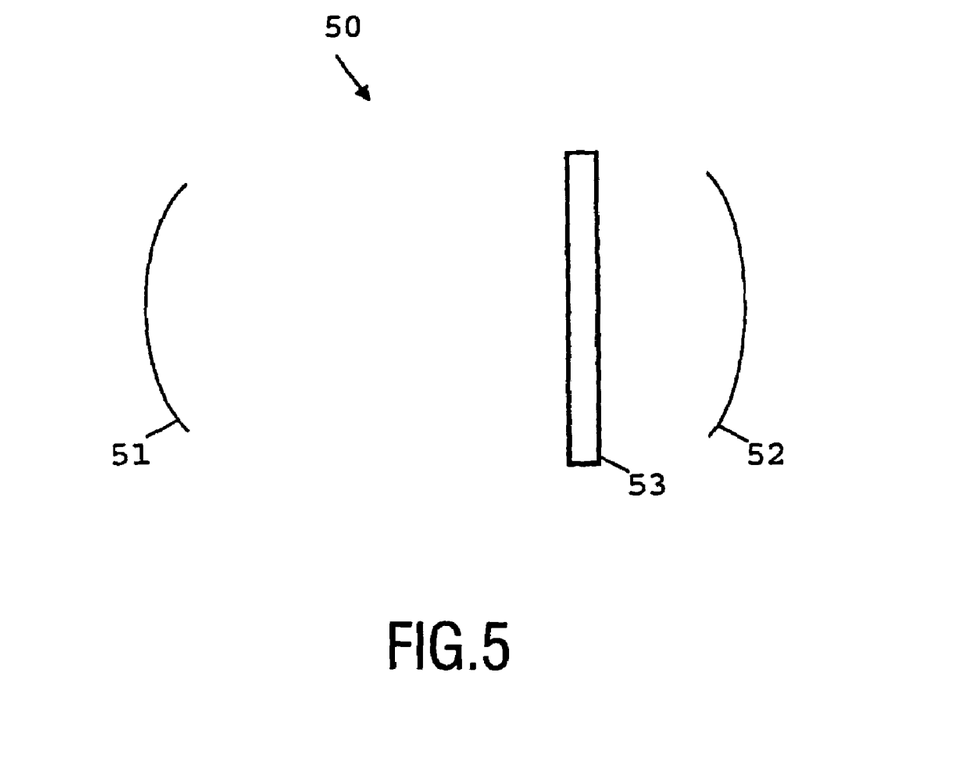
FIG. 5 shows a side view of a switchable optical element according to a second preferred embodiment of the present invention in place within a laser resonant cavity.

FIG. 5 shows a laser resonant cavity 50 including first and second mirrors 51,52, and a switchable optical element in the form of a diaphragm 53. The output beam from the laser cavity is dependent on the shape of the first and second mirrors 51,52, the separation of the first and second mirrors 51,52, and the presence of any restriction in the light path between the first and second mirrors 51,52, such as provided by the diaphragm 53. Laser resonators having finite aperture have been described extensively in "Laser beams and resonators", H. Kogelnik and T. Li, Appl. Opt. 5, (1966) pp 1550-1567 as well as in the book "Lasers", A. E. Siegman, University Science Books, Mill Valley, Calif. (chapter 19). To enable a particular laser source to be used for a number of applications, it is desired to alter the first and second mirrors 51,52, and/or diaphragm 53 to allow tuning of the resonant modes within the cavity, and therefore the output beam. However, conventional mechanical methods for implementing a tuneable laser cavity by adjusting the mirrors and/or diaphragm are expensive, bulky and unreliable. By using a diaphragm 53 according to an embodiment of the present invention it is possible to electrically control the mode structure within the cavity without reliance on mechanical moving parts.

Figure 6:
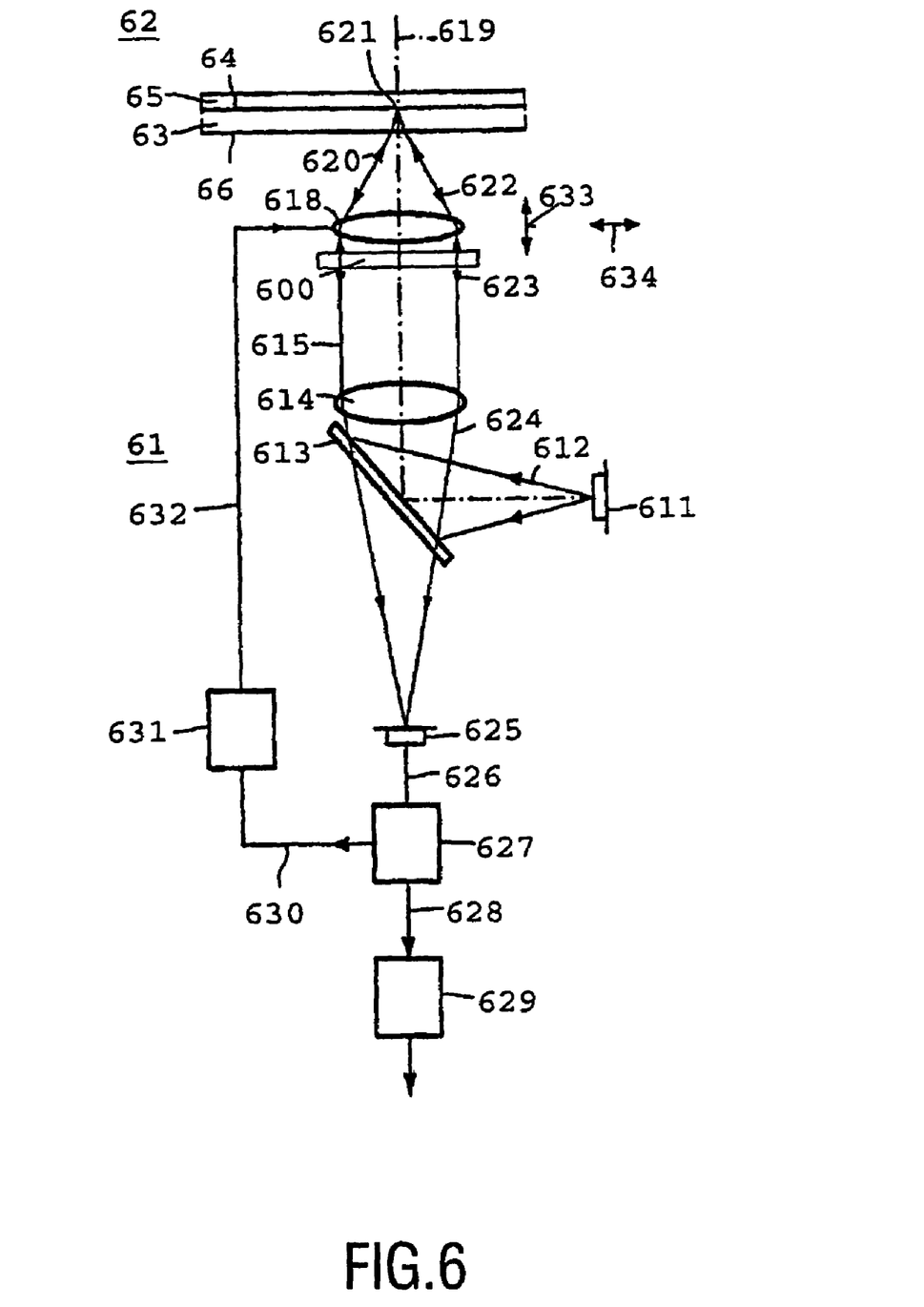
FIG. 6 shows a schematic side view of a switchable optical element according to a third preferred embodiment of the present invention in place within a device for scanning an optical record carrier.

Another application of the switchable diaphragm described is in a device 61 for scanning an optical record carrier 62. FIG. 6 shows a device 61 for scanning an optical record carrier 62, including an objective lens 618. The record carrier comprises a transparent layer 63, on one side of which an information layer 64 is arranged. The side of the information layer facing away from the transparent layer is protected from environmental influences by a protection layer 65. The side of the transparent layer facing the device is called the entrance face 66. The transparent layer 63 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 65 or by a further information layer and a transparent layer connected to the information layer 64.

Information may be stored in the information layer 64 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 61 comprises a radiation source 611 that can emit a radiation beam 612. The radiation source may be a semiconductor laser. A beam splitter 613 reflects the diverging radiation beam 612 towards a collimator lens 614, which converts the diverging beam 612 into a collimated beam 615. The collimated beam 615 is incident on an objective system 618 including a variable aperture diaphragm 600 according to an embodiment of the present invention.

The objective system may comprise one or more lenses and/or a grating. The objective system 618 has an optical axis 619. The objective system 618 changes the beam 17 to a converging beam 620, incident on the entrance face 66 of the record carrier 62. The objective system has a spherical aberration correction adapted for passage of the radiation beam through the thickness of the transparent layer 63. The converging beam 620 forms a spot 621 on the information layer 64. Radiation reflected by the information layer 64 forms a diverging beam 622, transformed into a substantially collimated beam 623 by the objective system 618 and subsequently into a converging beam 624 by the collimator lens 614. The beam splitter 613 separates the forward and reflected beams by transmitting at least part of the converging beam 624 towards a detection system 625. The detection system captures the radiation and converts it into electrical output signals 626. A signal processor 627 converts these output signals to various other signals.

One of the signals is an information signal 628, the value of which represents information read from the information layer 64. The information signal is processed by an information processing unit for error correction 629. Other signals from the signal processor 627 are the focus error signal and radial error signal 630. The focus error signal represents the axial difference in height between the spot 621 and the information layer 64. The radial error signal represents the distance in the plane of the information layer 64 between the spot 621 and the centre of a track in the information layer to be followed by the spot. The focus error signal and the radial error signal are fed into a servo circuit 631, which converts these signals to servo control signals 632 for controlling a focus actuator and a radial actuator respectively. The actuators are not shown in the Figure. The focus actuator controls the position of the objective system 618 in the focus direction 633, thereby controlling the actual position of the spot 621 such that it coincides substantially with the plane of the information layer 64. The radial actuator controls the position of the objective lens 618 in a radial direction 634, thereby controlling the radial position of the spot 621 such that it coincides substantially with the central line of track to be followed in the information layer 64. The tracks in the Figure run in a direction perpendicular to the plane of the Figure.

The device of FIG. 6 in this particular embodiment is adapted to also scan a second type of record carrier having a thicker transparent layer than the record carrier 62. The device uses a radiation beam having a different wavelength for scanning the record carrier of the second type. A second radiation source relating to the second type of record carrier is included in the device 61. In this preferred embodiment the radiation source 611 comprises a CD laser and a DVD laser, so the device is able to scan CD and DVD disks, and is further able to record on suitable CD and DVD disks.

The numerical aperture (NA) required of a light beam for reading from a CD disk is typically 0.45, whereas the NA required for reading a DVD disk is 0.65. By introducing the switchable diaphragm 600 into the optical path of the device 61 for scanning an optical record carrier at the objective system 618 it becomes possible to alter the beam NA to suit the format of both CD and DVD disks.

In addition to switching the diaphragm 600 to adjust the beam NA to suit a recording medium to be reproduced, the diaphragm can also be used to vary the NA of the beam when switching between a reproducing and a recording mode. When writing it is preferable to focus the beam on the disc with a somewhat higher NA than during reading of the disc, in order to produce a high peak power in the spot on the information layer of the disk. Writing of marks on the disc is done with the central peak of the spot on the disc, while the side lobes of the spot do not contain enough energy to alter the state of the recording medium. As a result, the higher NA, which makes the side lobes of the spot more sensitive for disc tilt, presents no problem during writing. Conversely, during reading it is preferable to produce a high rim intensity and very small side lobes to prevent crosstalk from side lobe reflections. Hence, for reading a lower NA is preferred than for the writing state. The diaphragm 600 can be used to help match the beam profile to recording or reading requirements. As well as producing changes in beam NA, a switchable optical element according to a preferred embodiment of the present invention can be used to alter a beam shape between recording and reading modes. As previously mentioned, a recording beam typically is shaped for high peak intensity. However, for reading it is important to reduce cross talk between adjacent tracks. In some instances an elliptical or other non-circularly symmetric beam shape can be used, the beam shaping introduced by varying the aperture shape of the switchable optical element.

Although the optical information storage system has been described as having CD and DVD capabilities, the switchable optical element can be similarly applied to systems having other information storage formats, for example Blu-ray Disc.

Oils suitable for use as the second fluid include mineral oils, for example silicon oils. The optical transmission properties of the oil chosen can be adjusted to provide an effect by adding suitable quantities of dye or pigment to the oil. By choosing the quantity and type of dye added to the oil different optical effects can be achieved. For example, to obtain the shutter or diaphragm described above the oil is rendered substantially opaque by addition of black dye. Alternatively, a coloured dye can be added to give a switchable filter effect. As another example, light scattering particles can be added to the oil to produce a switchable diffusely reflecting filter. It can be envisaged that oils having an innate colour or light scattering effect could be used instead of dyed or otherwise processed colourless oils to provide the desired change in optical transmissivity. It is to be understood that the switchable optical element could operate outside the visible spectrum, being active for example in the UV or IR parts of the electromagnetic spectrum. Applications for switchable filters include use in cameras and video cameras where a cyan filter can be used to switch between day and night sensitivity, or in video projection systems in which different colour images are overlaid by time sequential projection.

Figure 7:
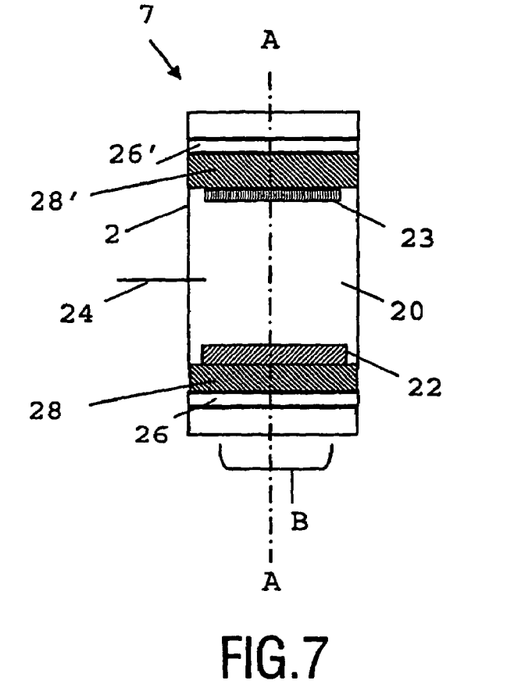
FIG. 7 shows a side view of a double switchable optical element according to a fourth preferred embodiment of the present invention in a first state.

FIG. 7 shows a switchable optical element 7 comprising a double colour filter. The double colour filter comprises two elements each arranged to function substantially as described in relation to the first embodiment of the invention but enclosed in a single fluid chamber without a solid separating boundary therebetween. A reduction in size is made possible by the incorporation of two filters in a single switchable optical element.

The fluid chamber 2 includes a first body of fluid 20, a second body of fluid 22 acting as a first filter and a third body of fluid 23 acting as a second filter. The first, second and third bodies of fluid 20,22,23 are displaced relative to one another along the optical axis. The first electrode 24 contacts the first body of fluid 20, and is common to both first and second filters.

To achieve the double filter effect, the transmissivity of the second and third fluids is chosen to be different. For example, the second body of fluid 22 is coloured cyan and in a first state is arranged within the switchable optical element 1 to form a continuous layer across the region B and thereby filter light passing through the switchable optical element 1 at region B. For example, the third body of fluid 23 is coloured magenta and in a first state is arranged within the switchable optical element 1 to form a continuous layer across the region B and thereby filter light passing through the switchable optical element 1 at region B. The density of all the fluids within the fluid chamber 2 is chosen to be substantially equal, giving stability when the switchable optical element 4 is subjected to gravitational and inertial loads. If the system is sufficiently small, the densities of the first and second fluid may differ.

By applying a suitable voltage across the common first electrode 24 and the second electrode 26 and/or a third electrode 26' of the first and second filters, a double filter can be produced in which either one or both of the filter layers made up by the second and third bodies of fluid 22,23 are switchable out of the optical path of the element. The third electrode 26' is separated from the bodies of fluid with the fluid chamber by a second contact layer 28'. The second contact layer 28' forms an insulating barrier between the third electrode 26' and the first, second and third bodies of fluid 20,22,23. The second and third electrodes 26,26' of the first and second filters, or other properties of the first and second filters can be varied so that each responds differently to an applied voltage, making a range of effects possible. More detail is given below in relation to the description of FIGS. 10 and 11.

Figure 8:
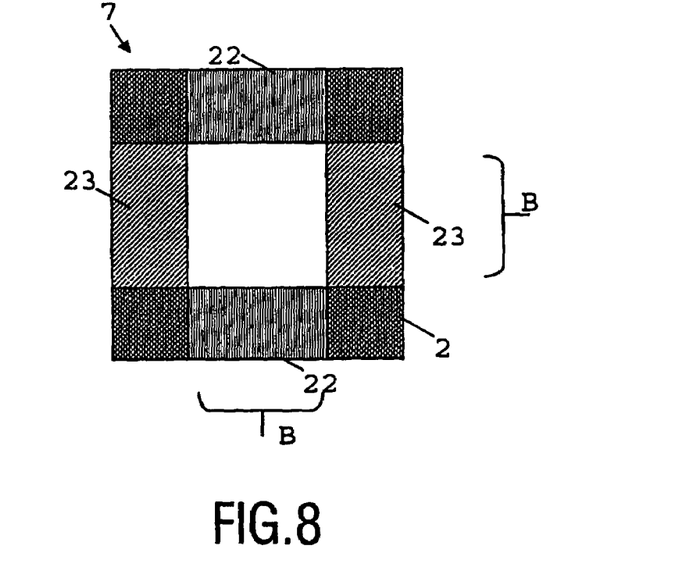
FIG. 8 shows a plan view of the switchable optical element of FIG. 7 in a second state.

FIG. 8 shows a plan view of the switchable optical element 4 when a voltage is applied to the first, second and third electrodes 24,26,26'. The second and third electrodes 26,26' each comprise a plurality of independently addressable line electrodes, however the lines of the second electrode 26 are arranged substantially perpendicular to one another so that the second and third bodies of fluid 22,23 can be moved away from the optical axis in different directions. Other electrode configurations can be used to provide different effects.

The interior walls of the fluid cavity which contact the water in the off state are substantially hydrophilic. In this way the water is retained between the two bodies of oil, and the oil bodies are hindered from moving away from the extremities of the element.

Figure 9:
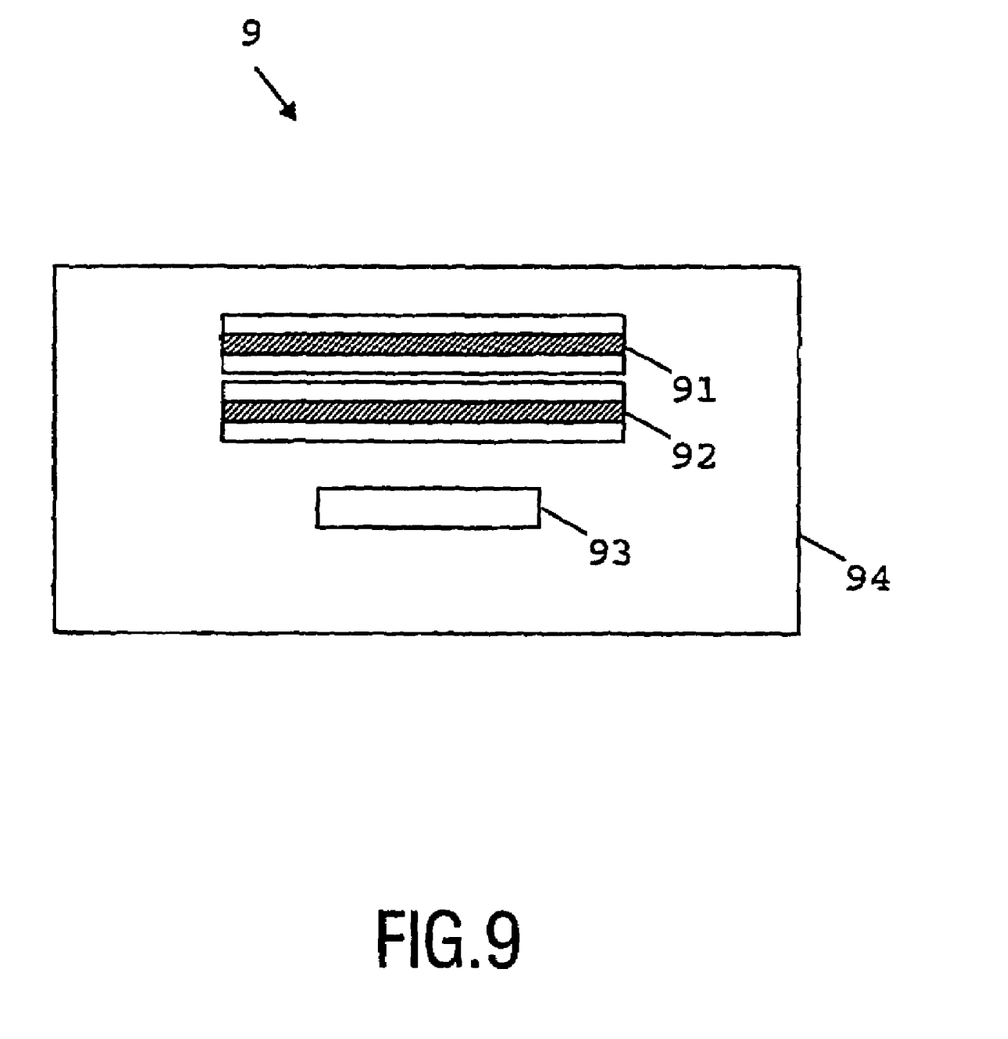
FIG. 9 shows a side view of a camera arrangement comprising two switchable optical elements according to embodiments of the present invention.

FIG. 9 shows a camera 9 comprising two switchable optical elements. A diaphragm 91 and a shutter 92 are provided, and can be used to control the reception of light at a CCD 93 or other optical detector within the camera 94. Using a diaphragm 91 and shutter 92 according to embodiments of the invention allows the diaphragm 91 and shutter 92 to be located very close to one another. This is advantageous as a compact device is produced. Also, by ensuring the shutter 92 is located close to the diaphragm 91 the required opening diameter of the shutter 92 is minimised. This is advantageous as the minimum switching time of the shutter 92 is decreased as the size of the shutter 92 is decreased.

In bright conditions the diameter of the diaphragm opening is reduced, and a fast shutter speed is required. As mentioned above a fast shutter speed can be more easily obtained when the shutter 92 is located close to the diaphragm, as the size of the required shutter opening is reduced. In low light conditions the diameter of the diaphragm opening is increased. However, in low light conditions it is also desired to have a long exposure time, so the increased size of the required shutter opening and the consequent slower switching can be accommodated.

By dynamically varying the size of the diaphragm opening at the same time as opening and closing the shutter 92 it is possible to achieve differing optical effects.

Figure 10:
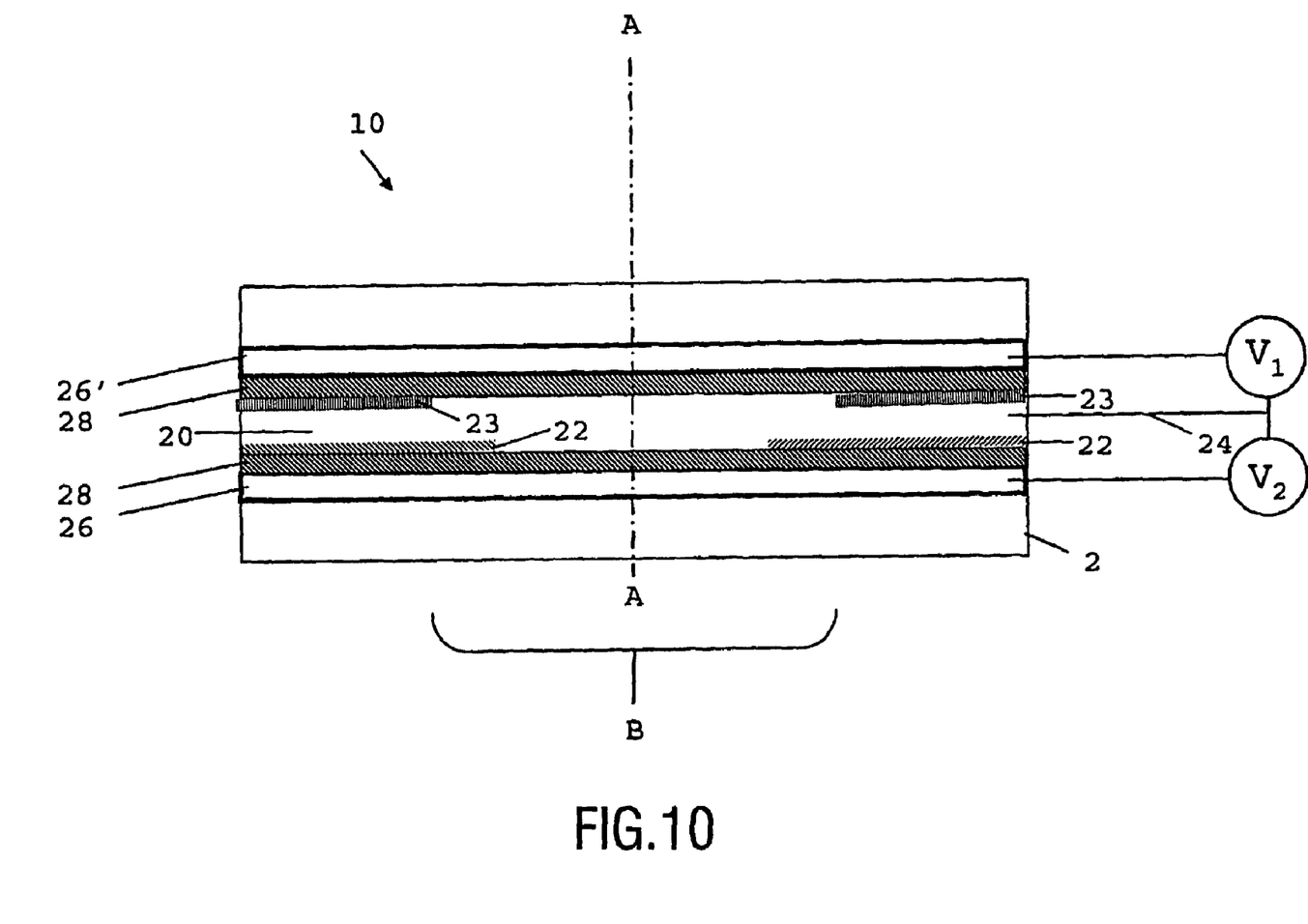
FIG. 10 shows a side view of a switchable optical element according to a fifth embodiment of the present invention.

FIG. 10 shows a side view of a switchable filter and diaphragm incorporated into a single device. As well as offering a reduction in size, by incorporating multiple elements into a package the number of boundaries through which light passing through the device must pass is reduced. As each boundary represents a possible reflective loss it is advantageous to reduce the number of boundaries. Furthermore, the manufacturing costs associated with producing a double element are reduced over the costs of producing two separate elements providing the same functionality.

Figure 11:
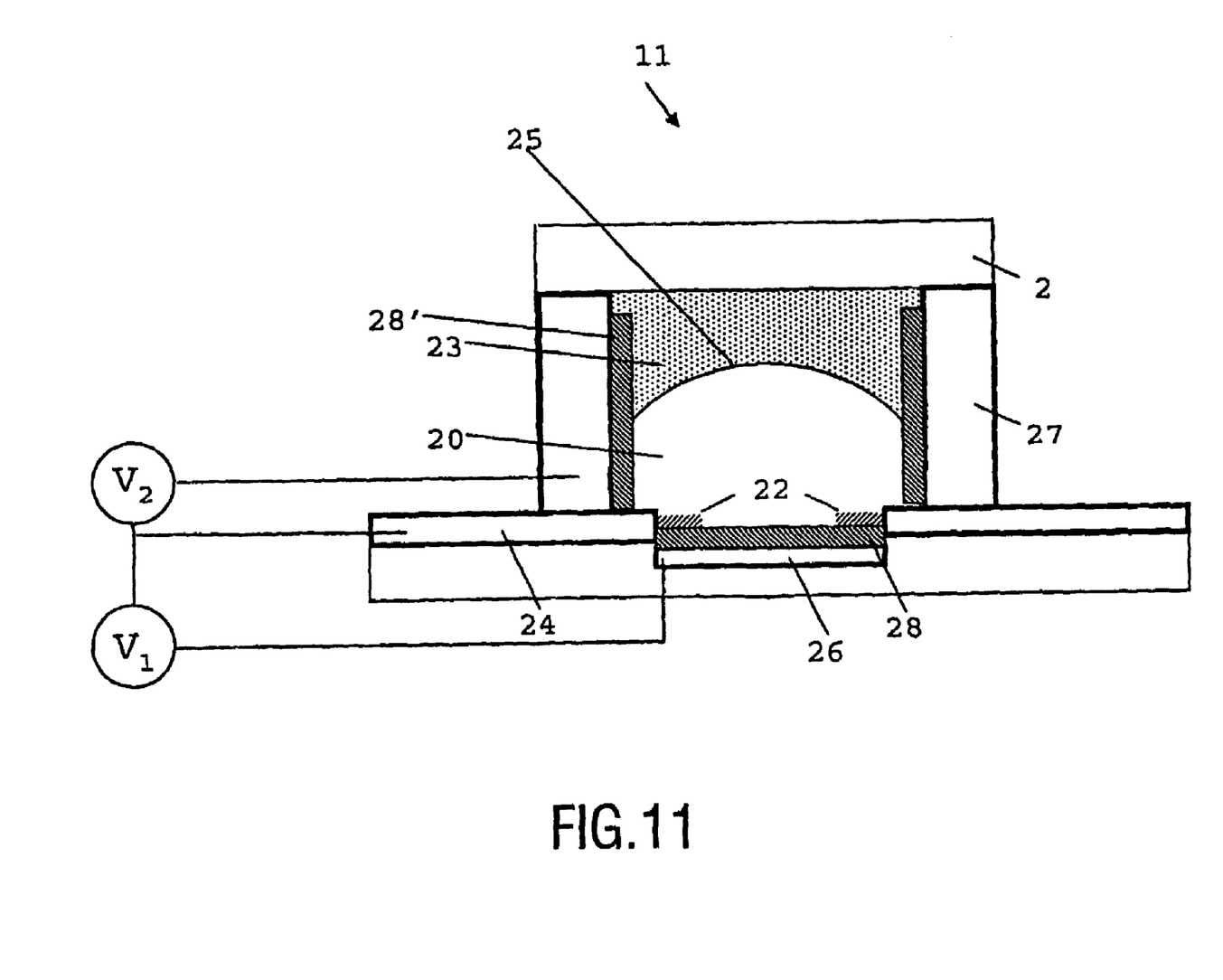
FIG. 11 shows a side view of a switchable optical element according to a sixth embodiment of the present invention.

Further integration of other elements is possible, for example see the opticial device 11 shown in FIG. 11. The optical device 11 comprises a lens and a switchable optical element. The lens shown by way of example in FIG. 11 is an adjustable, electrowetting lens formed integrally with the switchable optical element, however, other fixed or adjustable lenses could be coupled to the switchable optical element.

As well as the first and second electrodes 24, 26 the device of FIG. 11 further comprises a lens adjustment electrode 27 and a third body of fluid 23. The first and third bodies of fluid 20, 23 are substantially transparent and meet along a curved surface 25. The curvature of the surface 25 at rest is determined by the wettability of a second contact layer 28' by the first and third bodies of fluid 20, 23.

By applying a voltage V1 between the first and second electrodes the position of the second body of fluid 22 can be altered as described above to provide a diaphragm effect. By applying a voltage V2 between the first electrodes 24, and the lens adjustment electrode 27 the shape of the interface 25 between the first and third bodies of fluid can be varied to provide a lens of adjustable power.

Although the first fluid has been referred to herein as water, it is to be understood that this term encompasses a range of substantially polar and/or conducting fluids. It is possible to use fluid systems other than water and oil to provide a suitable electro-wetting effect, indeed one of the fluids may comprise a gas or vapour rather than a liquid. In the oil and water example, an electrolyte such as sodium chloride can be included in the water to allow electrical measurements to be carried out on the device.

For simplicity of manufacture the contact layer can comprise a hydrophobic surface coating on top of a substrate. The substrate can be formed in a desired shape, and the hydrophobic surface coating can be applied thereto. Using this technique can minimise the amount of hydrophobic material required to make the contact layer, which is advantageous as suitable hydrophobic materials tend to be relatively expensive. Suitable hydrophobic materials for use as the contact layer or the hydrophobic surface coating of the contact layer comprise amorphous fluoropolymers.

Switchable optical elements according to embodiments of the invention can be made relatively compact compared to mechanical arrangements for achieving similar effects. As well as being of compact diameter, the switchable optical elements can also be manufactured to be very thin in the direction of the optical axis. Practical devices can currently be fabricated with diameters as small as 500 μm, with a range of larger devices up to those on the cm scale also possible.

The switchable optical element can be controlled to provide switching times of the order of 10 ms when the diameter is small.

As has previously been mentioned, in order to increase the resistance of the switchable optical element to gravitational, rotational or shock loading the density of the oil and the water can be matched. In relatively small systems, the surface and interfacial tensions in the switchable optical element tend to dominate the inertial forces making the device relatively stable. Experimental testing suggests that devices of less than about 5 mm diameter are sufficiently stable for a range of first and second fluids. For larger devices, obtaining a close match in the density of the first and second fluids becomes more important. In order to provide a degree of fine tuning in the density of the water, a variable amount of methanol or other water soluble fluid having a density different to that of pure water can be mixed with the water. In this way the density of the water can be accurately altered to provide a good match to the density of the oil.

Density matching can also be achieved by mixing oils of different densities to match with the density of the other fluid.

As well as the example applications of switchable optical elements according to the present invention described herein, the skilled person can envisage other optical devices in which the switchable optical elements could be used. Furthermore, a plurality of switchable optical elements configured in series or parallel could be used to provide switchable transmission characteristics for an optical device.

For example, switchable red, green and blue filters could be combined in a time-sequential overlay projector, or other display applications.

The double filter embodiment of FIG. 7 comprises an example of switchable optical element including two variable characteristics. Clearly, all other combinations of variable characteristic are possible, e.g. shutter and filter, shutter and diaphragm, filter and diaphragm etc. Furthermore, in the embodiment of FIG. 11 including a variable lens, the switchable optical element can also have any of the variable characteristics described.

The switchable optical element described has a number of advantages over existing known devices and techniques. As well as describing the device in detail, a number of applications to which this technology is particularly suited have been provided.

The invention claimed is:

1. A switchable optical element comprising:
   a fluid chamber including first and second bodies of fluid disposed relative to one another along an optical axis of the switchable optical element,
   a third body of fluid within the fluid chamber disposed relative to the first and second bodies of fluid along the optical axis of the switchable optical element,
   a first electrode coupled to the first body of fluid,
   a second electrode, and
   a third electrode,
   wherein the second body of fluid is arranged to move substantially transverse to the optical axis in response to a voltage applied to the first and second electrodes and thereby change the transmissivity of the fluid chamber along the optical axis, and
   wherein the third body of fluid is arranged to move in a direction substantially transverse to the optical axis in response to a voltage applied to the first and third electrodes and thereby change the transmissivity of the fluid chamber along the optical axis.

2. The switchable optical element of claim 1, wherein the second fluid is a non-conducting liquid, and the first fluid is at least one of a polar liquid and a conducting liquid.

3. The switchable optical element of claim 1, further comprising a first contact layer forming an insulating barrier between the second electrode and the first and second bodies of fluid within the fluid chamber.

4. The switchable optical element of claim 3, wherein the first contact layer comprises a material with a higher wettability with respect to the second fluid than with respect to the first fluid.

5. The switchable optical element of claim 3, wherein the first contact layer comprises an amorphous fluoropolymer.

6. The switchable optical element of claim 3, wherein the first contact layer comprises a first area having a first wettability by the first fluid, and a second area having a second, higher wettability by the first fluid.

7. The switchable optical element of claim 6, wherein the area of increased wettability is provided on the optical axis of the switchable optical element.

8. The switchable optical element of claim 3, wherein movement of the second body of fluid is caused by an electro-wetting effect.

9. The switchable optical element of claim 8, wherein the first contact layer comprises an area at which separation of the second electrode from the first and second bodies of fluid is reduced to locally increase the electro-wetting effect.

10. The switchable optical element of claim 8, wherein the first contact layer comprises an area which protrudes into the fluid chamber to locally increase the electro-wetting effect.

11. The switchable optical element of claim 1, wherein interior surfaces of the fluid chamber comprise an inhomogeneity arranged to increase reproducibility of motion of the second body of fluid in response to a voltage applied to the first and second electrodes.

12. The switchable optical element of claim 1, wherein the second electrode comprises a plurality of independently addressable sections.

13. The switchable optical element of claim 12 wherein the independently addressable sections are arranged to provide different wettabilities across the first contact layer in response to a range of applied voltages.

14. The switchable optical element of claim 1, wherein the second electrode is transparent and arranged substantially transverse to the optical axis.

15. The switchable optical element of claim 1, further comprising a second contact layer forming an insulating barrier between the third electrode and the bodies of fluid within the fluid chamber.

16. The switchable optical element of claims 1, wherein the third body of fluid has a different transmissivity spectrum to the second body of fluid.

17. The switchable optical element of claim 1, wherein interior surfaces of the fluid chanter in contact with the first body of fluid when no voltage is applied to the switchable optical element are of higher wettability by the first fluid than by the second fluid.

18. The switchable optical element of claim 1, wherein all of said fluids are of substantially equal density.

19. The switchable optical element of claim 1, wherein the switchable optical element is at least one of a shutter, a diaphragm, a diffuse reflector or a filter.

20. An optical device comprising a switchable optical element, wherein the switchable optical element comprises:
   a fluid chamber including first and second bodies of fluid disposed relative to one another along an optical axis of the switchable optical element, the fluid chamber further including a third body of fluid disposed relative to the first and second bodies of fluid along the optical axis of the switchable optical element,
   a first electrode coupled to the first body of fluid,
   a second electrode, and
   a third electrode,
   wherein the second body of fluid is arranged to move substantially transverse to the optical axis in response to a voltage applied to the first and second electrodes and thereby change the transmissivity of the fluid chamber along the optical axis, and
   wherein the third body of fluid is arranged to move in a direction substantially transverse to the optical axis in response to a voltage applied to the first and third electrodes and thereby change the transmissivity of the fluid chamber along the optical axis.

21. The optical device of claim 20, further comprising at least a further switchable optical element configured in series or parallel with the switchable optical element to provide switchable transmission characteristic for the optical device.

22. The optical device of claim 20 further comprising a lens.

23. The optical device of claim 22 wherein the lens is formed integrally with the switchable optical element.

24. The optical device of claim 22 wherein the lens is an adjustable electrowetting lens.

25. The optical device of claim 20, further comprising a device for scanning an information layer of an optical record carrier, comprising a first radiation source for generating a first radiation beam and an objective system for converging the first radiation beam on the information layer, and the switchable optical element is arranged to control the first radiation beam.

26. The optical scanning device of claim 25 further comprising a second radiation source for generating a second radiation beam of different wavelength to the first radiation bean, wherein the objective system is selectively arranged to converge the first or second radiation beam on the information layer, and the switchable optical element is further arranged to control the second radiation beam.

27. The optical scanning device of claim 25, wherein the switchable optical element is incorporated into the objective system.

28. A method of manufacturing a switchable optical element, the method comprising the acts of;
   providing a fluid chamber including first and second bodies of fluid disposed relative to one another along an optical axis of the switchable optical element;
   providing a third body of fluid within the fluid chamber disposed relative to the first and second bodies of fluid along the optical axis of the switchable optical element; and
   providing a first electrode coupled to the first body of fluid, a second electrode, and a third electrode;
   wherein the second body of fluid is arranged to move substantially transverse to optical axis in response to a voltage applied to the first and second electrodes and thereby change the transmissivity of the fluid chamber along the optical axis, and
   wherein the third body of fluid is arranged to move in a direction substantially transverse to the optical axis in response to a voltage applied to the first and third electrodes and thereby change the transmissivity of the fluid chamber along the optical axis.

29. A method of manufacturing an optical scanning device for scanning an information layer of an optical record carrier, the method comprising the acts of;
   providing a first radiation source for generating a first radiation beam;
   providing an objective system for converging the first radiation beam on the information layer; and
   providing a switchable optical element arranged to control the first radiation beam, wherein the switchable optical element comprises:
   a fluid chamber including first and second bodies of fluid disposed relative to one another along an optical axis of the switchable optical element,
   a third body of fluid within the fluid chamber disposed relative to the first and second bodies of fluid along the optical axis of the switchable optical element,
   a first electrode coupled to the first body of fluid,
   a second electrode, and
   a third electrode,
   wherein the second body of fluid is arranged to move substantially transverse to the optical axis in response to a voltage applied to the first and second electrodes and thereby change the transmissivity of the fluid chamber along the optical axis, and
   wherein the third body of fluid is arranged to move in a direction substantially transverse to the optical axis in response to a voltage applied to the first and third electrodes and thereby change the transmissivity of the fluid chamber along the optical axis.

* * * * *